United States Patent
McKinstrie

(10) Patent No.: US 7,483,203 B2
(45) Date of Patent: Jan. 27, 2009

(54) PHASE-SENSITIVE AMPLIFICATION IN A FIBER

(75) Inventor: Colin J. McKinstrie, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 225 days.

(21) Appl. No.: 11/154,483

(22) Filed: Jun. 16, 2005

(65) Prior Publication Data

US 2006/0285197 A1    Dec. 21, 2006

(51) Int. Cl.
    H04B 10/17    (2006.01)
(52) U.S. Cl. ..................................... 359/333
(58) Field of Classification Search .................. 359/333
    See application file for complete search history.

(56) References Cited

U.S. PATENT DOCUMENTS

| | | | | |
|---|---|---|---|---|
| 3,875,422 | A * | 4/1975 | Stolen | 359/330 |
| 5,353,362 | A * | 10/1994 | Tucci | 385/27 |
| 6,522,818 | B1 * | 2/2003 | Aso et al. | 385/122 |
| 7,369,779 | B1 * | 5/2008 | Croussore et al. | 398/176 |
| 2004/0042060 | A1 * | 3/2004 | McKinstrie et al. | 359/330 |
| 2004/0095635 | A1 * | 5/2004 | Kakui | 359/334 |

OTHER PUBLICATIONS

G. M. D'Ariano. Squeezing-symmetry of the balanced homodyne detector. From book titled: Quantum Aspects of Optical Communications. © 1991. DOI—10.1007/3-540-53862-3_193. http://www.springerlink.com/content/f12w2k01358123qv.*

Agrawal, Govind P. Fiber-Optic Communication Systems. © 1997, John Wiley and Sons Inc. New York, NY. pp. 62-65, 326-329, 380-385, 392-397, 448-449.*

M. Vasilyev, "Distributed phase-sensitive amplification," Opt. Express 13, 7563-7571 (2005) http://www.opticsinfobase.org/abstract.cfm?URI=oe-13-19-7563.*

K. Abe, M. Amano, and T. Omatsu, "Efficient phase conjugation by pico-second four-wave-mixing in solid-dye amplifier," Opt. Express 12, 1243-1248 (2004) http://www.opticsinfobase.org/abstract.cfm?URI=oe-12-7-1243.*

(Continued)

Primary Examiner—Jack W Keith
Assistant Examiner—Ari M Diacou

(57) ABSTRACT

A method of and device for generating an amplified optical signal directly in an optical fiber by way of phase-sensitive amplification based on one or more four-wave mixing (FWM) processes. In one embodiment, an input signal and two pump waves are applied to a highly nonlinear fiber (HNLF). The input signal is amplified in the HNLF due to energy transfer from the pump waves to the input signal via a degenerate phase-conjugation (PC) process. In another embodiment, an input signal and first and second pump waves are applied to a first HNLF to generate, via a Bragg scattering (BS) process, an idler signal corresponding to the input signal. The second pump wave is then filtered out and the first pump wave, a third pump wave, and the input and idler signals are applied to a second HNLF, where they interact via a non-degenerate PC process to produce an amplified output signal.

28 Claims, 4 Drawing Sheets

OTHER PUBLICATIONS

D. R. Matthys and E. T. Jaynes, "Phase-sensitive optical amplifier," J. Opt. Soc. Am. 70, 263- (1980) http://www.opticsinfobase.org/abstract.cfm?URI=josa-70-3-263.*

K. Croussore, I. Kim, Y. Han, C. Kim, G. Li, and S. Radic, "Demonstration of phase-regeneration of DPSK signals based on phase-sensitive amplification," Opt. Express 13, 3945-3950 (2005) http://www.opticsinfobase.org/abstract.cfm?URI=oe-13-11-3945.*

C. J. McKinstrie, R. O. Moore, S. Radic, and R. Jiang, "Phase-sensitive amplification of chirped optical pulses in fibers," Opt. Express 15, 3737-3758 (2007) http://www.opticsinfobase.org/abstract.cfm?URI=oe-15-7-3737.*

D. Levandovsky, M. Vasilyev, and P. Kumar, "Amplitude squeezing of light by means of a phase-sensitive fiber parametric amplifier," Opt. Lett. 24, 984-986 (1999) http://www.opticsinfobase.org/abstract.cfm?URI=ol-24-14-984.*

Ruo-Ding Li; Kumar, P.; Kath, W.L., "Dispersion compensation with phase-sensitive optical amplifiers," Lightwave Technology, Journal of, vol. 12, No. 3, pp. 541-549, Mar. 1994. URL: http://ieeexplore.ieee.org/iel/50/7064/00285338.pdf.*

Robert W. W. Boyd. Nonlinear Optics. Elsevier Science & Technology Books. Pub. Date: Dec. 1992. pp. 241-257.*

"Theory of Noise Accumulation in Linear Optical-Amplifier Chains," by Rodney Loudon, IEE Journal of Quantum Electronics, vol. QB-21, No. 7, Jul. 1985, pp. 766-773.

"Reduction of Quantum Fluctuation and Suppression of the Gordon-Haus Effect With Phase-Sensitive Linear Amplifiers," by Horace P. Yuen, Optical Society of America, Optics Letters, vol. 17, No. 1, Jan. 1, 1992, pp. 73-75.

"Parametric Amplifiers in Phase-Noise-Limited Optical Communications," by Yi Mu and C.M. Savage, Optical Society of America, vol. 9, No. 1, Jan. 1992, pp. 65-70.

"Combating Dispersion with Parametric Amplifiers," Ruo-Ding et al., IEEE Phtonics Technology Letters, vol. 5, No. 6, Jun. 1993, pp. 669-672.

"Reduction of Fiber-Nonlinearity-Enhanced Amplifier Noise by Means of Phase-Sensitive Amplifiers," by Wataru Imajuku and Atsushi Takada, Optical Society of America, Optics Letters, vol. 22, No. 1, Jan. 1, 1997, pp. 31-33.

Generation and Detection of Two-Photon Coherent States in Degenerate Four-Wave Mixing,—by Horace P. Yuen and Jeffrey H. Shapiro, Optical Society of America, Optics Letters, vol. 4, No. 10, Oct. 1979, pp. 334-336.

"Use of Cavities in Squeezed-State Generation," Bernard Yurke, The American Physical Society, Physical Review A, vol. 29, No. 1, Jan. 1984, pp. 408-410.

"Squeezed-State Generation Via Forward Degenerate Four-Wave Mixing," by Prem Kumar and Jeffrey Shapiro, vol. No. 3, The American Physical Society, Physical Review A, Sep. 1984, pp. 1568-1571.

"Generation and Detection of Squeezed States of Light by Nondegenerate Four-Wave Mixing in an Optical Fiber," by M.D. Levenson, et al., The American Physical Society, Physical Review A, vol. 32, No. 3, Sep. 1985, pp. 1550-1562.

"Squeezed -Light Generation in a Medium Governed by the Nonlinear Schrödinger Equation," by M.J. Potasek and B. Yurke, The American Physical Society, Physical Review A, vol. 35, No. 9, May 1, 1987, pp. 3974-3977.

"Quantum propagation: Squeezing via modulation polarization instabilities in a birefringent nonlinear medium," by T.A.B. Kennedy and S. Wabnitz, The American Physical Society, Physical Review A, vol. 38, No. 1, Jul. 1988, pp. 563-569.

"Squeezing of oulses in a nonlinear interferometer," by M. Shirasaki and H.A. Haus, Optical Society of America, J. Opt. Soc. Am. B, vol. 7, No. 1, Jan. 1990, pp. 30-34.

"Optical Amplification in a nonlinear fibre interferometer," by M.E. Marhic et al, Electronics Letters, vol. 27, No. 3, Jan. 31, 1991, pp. 210-211.

"Nonlinear Optics," by Robert W. Boyd, The Institute of Optics, Chapter 1: The Nonlinear Susceptibility, pp. 1-37, Chapter 2: Wave-Equation Description of Nonlinear Optical Interactions, pp. 57-63.

* cited by examiner

PHASE-SENSITIVE AMPLIFICATION IN A FIBER

BACKGROUND OF THE INVENTION

1. Field of the Invention

The present invention relates to optical communication equipment and, more specifically, to optical amplifiers.

2. Description of the Related Art

Optical communication systems employ optical amplifiers, e.g., to compensate for signal attenuation in optical fibers. One type of amplifier that may be used in a fiber-based optical communication system is an optical fiber amplifier (OFA). Many current optical communication systems employ erbium-doped and/or Raman fiber amplifiers. These amplifiers are examples of phase-insensitive amplifiers (PIAs). More specifically, a PIA produces signal gain that is independent of the signal phase. In contrast, a phase-sensitive amplifier (PSA) produces signal gain that does depend on the signal phase. Potential advantages of using PSAs instead of or in addition to PIAs in optical communication systems include, but are not limited to, noise reduction, the reduction of noise-induced frequency and phase fluctuations, dispersion compensation, and suppression of modulational instability. A more detailed discussion of these and other potential advantages of PSA use in optical communication systems can be found, e.g., in the following publications: (1) R. Loudon, "Theory of Noise Accumulation in Linear Optical-Amplifier Chains," Institute of Electrical and Electronic Engineers (IEEE) Journal of Quantum Electronics, vol. 21, pp. 766-773 (1985); (2) H. P. Yuen, "Reduction of Quantum Fluctuation and Suppression of the Gordon-Haus Effect with Phase-Sensitive Linear Amplifiers," Optics Letters, vol. 17, pp. 73-75 (1992); (3) Y. Mu and C. M. Savage, "Parametric Amplifiers in Phase-Noise-Limited Optical Communications," Journal of the Optical Society of America B, vol. 9, pp. 65-70 (1992); (4) R. D. Li, P. Kumar, W. L. Kath, and J. N. Kutz, "Combating Dispersion with Parametric Amplifiers," IEEE Photonics Technology Letters, vol. 5, pp. 669-672 (1993); and (5) W. Imajuku and A. Takada, "Reduction of Fiber-Nonlinearity-Enhanced Amplifier Noise by Means of Phase-Sensitive Amplifiers," Optics Letters, vol. 22, pp. 31-33 (1997), the teachings of all of which are incorporated herein by reference. However, PSAs suitable for use in fiber-based optical communication systems are not yet sufficiently developed.

SUMMARY OF THE INVENTION

Problems in the prior art are addressed, in accordance with the principles of the present invention, by a method of and device for generating an amplified optical signal directly in an optical fiber by way of phase-sensitive amplification based on one or more four-wave mixing (FWM) processes. In one embodiment, an input signal and two pump waves are applied to a highly nonlinear fiber (HNLF). The input signal is amplified in the HNLF due to energy transfer from the pump waves to the input signal via a degenerate phase-conjugation (PC) process. The amplified signal is then separated from the pump waves by an optical filter placed at the end of the HNLF.

In another embodiment, an input signal and first and second pump waves are applied to a first HNLF to generate, via a Bragg scattering (BS) process, an idler signal corresponding to the input signal. A first optical filter placed at the end of the first HNLF then filters out the second pump wave while passing the first pump wave and the input and idler signals to a second HNLF, which also receives a third pump wave. In the second HNLF, the first and third pump waves and the input and idler signals interact via a non-degenerate PC process, which results in energy transfer from the pump waves to the input signal. The amplified input signal is then separated from the pump waves and the idler signal by a second optical filter placed at the end of the second HNLF.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Optical Parametric Amplification

As known in the art, optical parametric amplification (OPA) is a process that produces a tunable coherent optical signal via nonlinear optical processes, in which, typically, one or two pump-wave photons are converted into two new photons with conservation of photon energy and momentum. The waves corresponding to the two new photons are usually referred to as a signal and an idler. An excellent review of the fundamentals of OPA can be found in a book by G. P. Agrawal, "Nonlinear Fiber Optics" (Third Edition), Academic Press, 2001.

Figure 1:
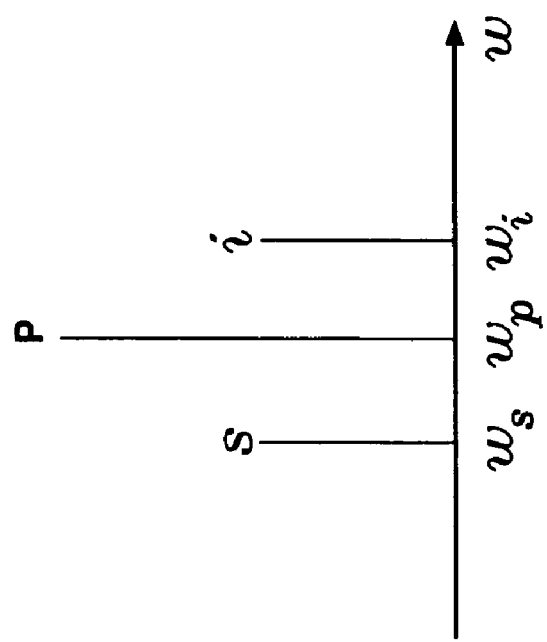
FIG. 1 graphically illustrates a simplified diagram of the frequency structure developed via a representative optical parametric amplification (OPA) process in a single-pump configuration.

FIG. 1 graphically illustrates a representative OPA process in a single-pump configuration. More specifically, in the configuration of FIG. 1, the OPA process is governed by degenerate four-wave mixing (FWM), in which two pump photons (labeled P in FIG. 1) combine to generate one "signal" photon and one "idler" photon (labeled s and i, respectively, in FIG. 1) according to the following equation:

$$2\omega_P = \omega_s + \omega_i \qquad (1)$$

where $\omega_P$, $\omega_s$, and $\omega_i$ are the frequencies of the pump, signal, and idler photons, respectively. The nonlinear medium, in which the FWM process occurs, is characterized by a nonlinearity coefficient ($\gamma$) and a set dispersion coefficients, each of which is frequency dependent. The frequency or wavelength at which the second-order dispersion coefficient equals zero is referred to as the zero-dispersion frequency ($\omega_0$) or wavelength ($\lambda_0$). The regions in which the second-order dispersion coefficient is positive and negative are referred to as the normal dispersion region and the anomalous dispersion region, respectively.

The degenerate FWM process of FIG. 1 occurs when the wavelength of the pump wave is in the anomalous dispersion region of the nonlinear optical medium (e.g., optical fiber). It is known in the art that the parametric gain depends on the intensity of the pump wave ($I_p$) and the interaction length in the optical fiber. Depending on the relationship between (1) the wave-vector mismatch coefficient ($\kappa$) in the optical fiber, (2) the nonlinearity coefficient, $\gamma$, and (3) the intensity of the pump wave, $I_p$, FWM can produce either exponential or quadratic gain. For example, if the intensity of the pump wave is chosen such that $\kappa=-\gamma I_p$, then the gain is relatively high and exponential. In contrast, if $\kappa=0$, then the gain is quadratic. Other values of $\kappa$ will correspond to a relatively low exponential gain.

Figure 2:
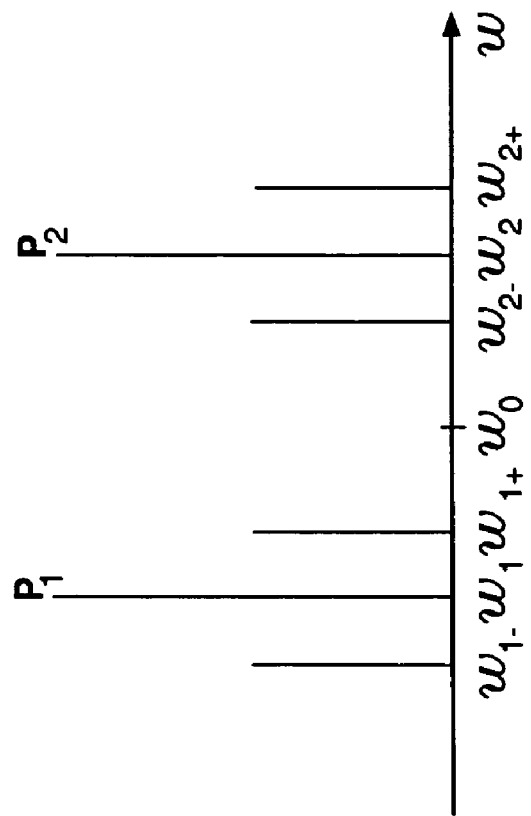
FIG. 2 graphically illustrates a simplified diagram of the frequency structure developed via OPA in a double-pump configuration.

FIG. 2 shows a simplified diagram of the frequency structure developed via OPA in a two-pump configuration. In the presence of two pump waves labeled $P_1$ and $P_2$ located at frequencies $\omega_1$ and $\omega_2$, respectively, and an optical communication signal (illustratively a sideband at frequency $\omega_{1-}$), various FWM interactions in the nonlinear optical medium produce three complementary sidebands at frequencies $\omega_{1+}$, $\omega_{2-}$, and $\omega_{2+}$. In general, the optical communication signal may correspond to any one of the four sidebands, with the remaining three sidebands being generated by FWM processes.

The following describes the FWM processes that lead to the frequency structure shown in FIG. 2. Assuming that the optical communication signal is at frequency $\omega_{1-}$ and the remaining three sidebands are idler sidebands, the modulational interaction (MI) produces a first idler sideband at frequency $\omega_{1+}$ according to Eq. (2):

$$2\omega_1 = \omega_{1-} + \omega_{1+} \quad (2)$$

A Bragg scattering (BS) process produces a second idler sideband at frequency $\omega_{2-}$ according to Eq. (3):

$$\omega_{1-} + \omega_2 = \omega_1 + \omega_{2-} \quad (3)$$

A phase-conjugation (PC) process produces a third idler sideband at frequency $\omega_{2+}$ according to Eq. (4):

$$\omega_1 + \omega_2 = \omega_{1-} + \omega_{2+} \quad (4)$$

In addition, each of the three idler sidebands is coupled to the other two idler sidebands by an appropriate FWM process, i.e., MI, BS, or PC, that can be expressed by an equation analogous to one of Eqs. (2), (3), or (4).

In addition to the sidebands illustrated in FIG. 2, OPA may also generate several additional sidebands (not shown). For example, MI with $P_2$ generates an additional sideband at frequency $2\omega_2-\omega_1+\delta\omega$, where $\delta\omega=\omega_1-\omega_{1-}$. Also, a BS process with respect to $P_1$ generates another sideband at frequency $2\omega_1-\omega_2-\delta\omega$. Similarly, the sidebands at frequencies $\omega_{1+}$ and $\omega_{2-}$ are each coupled to additional sidebands at frequencies $2\omega_2-\omega_1-\delta\omega$ and $2\omega_1-\omega_2+\delta\omega$, and the sideband at frequency $\omega_{2+}$ is coupled to the aforementioned additional sidebands with frequencies $2\omega_2-\omega_1+\delta\omega$ and $2\omega_1-\omega_2-\delta\omega$.

However, unlike the four original sidebands shown in FIG. 2, each of which is coupled to each of the other three, none of the additional sidebands is coupled to all of the original four or all of the other three additional sidebands. Furthermore, for most values of $\delta\omega$, the additional sidebands are driven non-resonantly. Consequently, effects of the additional sidebands on the overall OPA process are relatively small and, for all practical purposes, can be substantially ignored. Numerical simulations validate this conclusion.

Phase-Sensitive Amplification in a $\chi^{(2)}$ Medium

A representative prior-art scheme for phase-sensitive amplification (and squeezed-state generation) is described in a book by R. Loudon, "The Quantum Theory of Light," 3rd Ed., Oxford University Press, Oxford, 2000. More specifically, phase-sensitive amplification in a $\chi^{(2)}$ medium can occur via degenerate parametric amplification (DPA, also referred to as frequency down-conversion). As known in the art, a $\chi^{(2)}$ medium is a nonlinear optical medium characterized in that its nonlinear optical response is governed primarily by the second-order nonlinear optical susceptibility ($\chi^{(2)}$, a second-rank tensor). Typically, a $\chi^{(2)}$ medium is a non-centrosymmetric crystal, two representative examples of which are (i) a lithium iodate crystal (LiIO$_3$) and (ii) a KTP crystal (potassium titanium oxide phosphate, KTiPO$_4$).

In a DPA process, a pump wave interacts with signal and idler waves of a lower frequency, where the signal and idler waves have the same (i.e., common) frequency. This interaction is governed by the frequency-matching condition $$\chi_2 = 2\omega_1 \quad (5)$$

where $\omega_2$ is the pump frequency and $\omega_1$ is the common signal and idler frequency. Amplitude changes of waves <1> and <2> are governed by Eqs. (6) and (7):

$$d_z A_1 = i 2\bar{\gamma} A_2 A_1^* \exp(-i\beta z) \quad (6)$$

$$d_z A_2 = i\bar{\gamma} A_1^2 \exp(i\beta z) \quad (7)$$

where $A_j$ is the amplitude of the corresponding wave, z is the coordinate along the wave propagation direction, $\bar{\gamma}$ is the nonlinear coupling coefficient, and $\beta = 2\beta_1 - \beta_2$ is the linear wavenumber mismatch. One can choose the amplitude units in such a way that $|A_j|^2$ is proportional to the photon flux $P_j$.

Suppose that wave <2> is a relatively strong pump wave and wave <1> is a relatively weak signal wave. Then, in the small-signal (undepleted-pump) approximation, $A_2(z)=A_2(0)$, where $A_2(0)$ is the wave amplitude at the beginning of the medium. Let $$A_1(z) = B_1 \exp(-i\beta z/2)$$

Then, $B_1$ obeys the following (linearized) equation:

$$(d_z - i\delta)B_1 = i\gamma B_1^* \quad (8)$$

where $\delta = \beta/2$ and $\gamma = 2\bar{\gamma} A_2$. Eq. (8) has a solution $$B_1(z) = \mu(z) B_1(0) + \nu(z) B_1(0)^* \quad (9a)$$

where the transfer functions $\mu(z)$ and $\nu(z)$ are:

$$\mu(z) = \cos h(\kappa z) + i(\delta/\kappa) \sin h(\kappa z) \quad (9b)$$

$$\nu(z) = i(\gamma/\kappa) \sin h(\kappa z) \quad (9c)$$

and the growth rate $\kappa$ is:

$$\kappa = (|\gamma|^2 - \delta^2)^{1/2}$$

The input-output relation described by Eqs. (9) is a property of phase-sensitive amplification. In quantum optics this relation is called a squeezing transformation.

To illustrate important characteristics of phase-sensitive amplification, consider a simple case, in which $\delta=0$, and suppose that $A_2$ is real (measure the signal phase relative to the pump phase). Then, according to Eqs. (9), the in-phase signal quadrature $(B_1+B_1^*)/2$ is amplified by the factor $\exp(\kappa z)$, whereas the out-of-phase quadrature $(B_1-B_1^*)/2$ is attenuated by the same factor (i.e., multiplied by the factor $\exp(-\kappa z)$). This property of phase-sensitive amplification is largely responsible for the advantages of PSAs over PIAs specified in the background section.

Phase-Sensitive Amplification in a $\chi^{(3)}$ Medium

As known in the art, a $\chi^{(3)}$ medium is a nonlinear optical medium characterized in that its nonlinear optical response is governed primarily by the third-order nonlinear optical susceptibility ($\chi^{(3)}$, a third-rank tensor). Typically, a $\chi^{(3)}$ medium is a centrosymmetric crystal or nonlinear glass. One representative example of a $\chi^{(3)}$ medium is a Kerr medium, in which the nonlinear response has a special form of $\chi^{(3)}|E|^2 E$ (where E is the electric field) often referred to as the Kerr nonlinearity. More details on various forms of nonlinear optical interactions in $\chi^{(2)}$ and $\chi^{(3)}$ media can be found, e.g., in a book by R. W. Boyd, entitled "Nonlinear Optics," Academic Press, 1992, pp. 1-37 and 57-63, the teachings of which are incorporated herein by reference.

Representative examples of prior-art phase-sensitive amplification in a $\chi^{(3)}$ medium are described in: (i) H. P. Yuen and J. H. Shapiro, "Generation and Detection of Two-Photon Coherent States in Degenerate Four-Wave Mixing," Opt. Letters, vol. 4, pp. 334-336 (1979); (ii) B. Yurke, "Use of Cavities in Squeezed-State-Generation," Phys. Rev. A, vol. 29, pp. 408-410 (1984); and (iii) P. Kumar and J. H. Shapiro, "Squeezed-State Generation via Forward Degenerate Four-Wave Mixing," Phys. Rev. A, vol. 30, 1568-1571 (1984), the teachings of all of which are incorporated herein by reference.

The Yuen and Yurke references disclose schemes that utilize a degenerate backward FWM process. More specifically, a degenerate backward FWM process uses a counter-propagating pump configuration, in which two pump waves having the same frequency travel in opposite directions. Due to the phase-matching condition, the signal and idler waves travel in opposite directions as well. Phase sensitivity (and squeezing) is obtained by the use of a semi-transparent (50/50) beam splitter (Yuen) or a partly reflecting cavity mirror (Yurke) placed outside the $\chi^{(3)}$ medium, which splitter/mirror combines the signal and idler waves to produce a desired squeezed state.

The Kumar reference discloses a scheme that is similar to the scheme disclosed in the Yuen reference, except that the counter-propagating pump configuration is replaced with a nominally co-propagating pump configuration. More specifically, each of the pump waves propagates at a small angle with respect to a selected axis. To satisfy the phase-matching condition, each of the signal and idler waves also propagates at that small angle with respect to that selected axis such that the plane passing through the wave vectors of the pump waves is orthogonal to the plane passing through the wave vectors of the signal and idler waves. In addition, all waves in the Kumar reference have the same frequency.

It should be noted that the $\chi^{(3)}$ medium employed in either of the above schemes is a three-dimensional (3D) medium, i.e., a medium for which the transverse dimensions are comparable with the longitudinal dimension. In contrast, an optical fiber is a substantially one-dimensional medium because the fiber's transverse dimension (e.g., diameter) is typically much smaller than its longitudinal dimension (e.g., length).

First attempts to achieve phase-sensitive amplification in a fiber are disclosed in (1) M. Shirasaki and H. A. Haus, "Squeezing of Pulses in a Nonlinear Interferometer," Journal of the Optical Society of America B, vol. 7, pp. 30-34 (1990) and (2) M. E. Marhic and C. H. Hsia, "Optical Amplification in a Nonlinear Interferometer," Electronics Letters, vol. 27, pp. 210-211 (1991). More specifically, these references disclose schemes, each of which utilizes a nonlinear interferometer. The interferometer employs one or more 50/50 beam splitters to (1) direct the pump and signal waves along two interferometer arms, where the waves interact, and (2) combine the waves emerging from the arms to produce the corresponding squeezed states. Note that, in each of these interferometer schemes, (i) a single pump source is used to produce the pump waves that interact with the signal wave(s) in the interferometer arms and (ii) the signal gain increases as a quadratic function of the arm (fiber) length.

Four-Wave Mixing in a $\chi^{(3)}$ Medium

Figure 3:
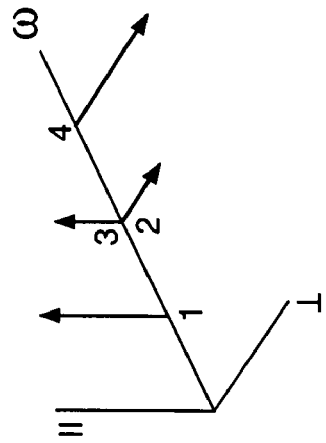
FIG. 3 graphically illustrates a scalar four-wave mixing (FWM) process according to one embodiment of the invention.

FIG. 3 graphically illustrates a scalar FWM (inverse MI) process according to one embodiment of the invention. More specifically, FIG. 3 shows a polarization diagram, in which (i) each arrow represents a wave, with the length of the arrow schematically representing the wave's intensity, (ii) the position of the arrow along the $\omega$-axis indicates the frequency of the wave, and (iii) the orientation of the arrow with respect to the $\perp$ and $\parallel$ axes represents the wave's polarization. In FIG. 3, waves <1> and <3> are pump waves and wave <2> is a signal wave, where all waves are (vertically) co-polarized and propagate in a fiber along the same direction.

The scalar FWM process illustrated in FIG. 3 is governed by the frequency-matching condition given by Eq. (10):

$$\omega_3 + \omega_1 = 2\omega_2 \tag{10}$$

and the amplitude equations given by Eqs. (11):

$$d_z A_1 = i\bar{\gamma}(|A_1|^2 + 2|A_2|^2 + 2|A_3|^2)A_1 + i\bar{\gamma}A_2^2 A_3^* \exp(i\beta z) \tag{11a}$$

$$d_z A_2 = i\bar{\gamma}(2|A_1|^2 + |A_2|^2 + 2|A_3|^2)A_2 + i2\bar{\gamma}A_3 A_1 A_2^* \exp(-i\beta z) \tag{11b}$$

$$d_z A_3 = i\bar{\gamma}(2|A_1|^2 + 2|A_2|^2 + |A_3|^2)A_3 + i\bar{\gamma}A_1^* A_2^2 \exp(i\beta z) \tag{11c}$$

where $A_j$ is the amplitude of the corresponding wave, z is the wave propagation direction, $\bar{\gamma}$ is the nonlinear coupling coefficient, and $\beta=2\beta_2-\beta_3-\beta_1$ is the wavenumber mismatch. In this scalar FWM process, the signal and idler are substantially identical. The self-phase modulation (SPM) and cross-phase modulation (CPM) coefficients are not exactly equal to $\bar{\gamma}$ and $2\bar{\gamma}$, respectively. However, the deviations of these coefficients from the stated values are qualitatively unimportant and, for typical frequencies, are quantitatively insignificant. In one embodiment, $\omega_2$ is located within about 10 THz of $\omega_0$ (the zero-dispersion frequency).

Suppose that waves <1> and <3> are relatively strong pump waves and wave <2> is a relatively weak signal wave. Then, in the small-signal approximation, the pump photon-fluxes ($P_{1,3}$) are constant and:

$$A_3(z) = A_3(0)\exp[i\bar{\gamma}(2P_1+P_3)z] \tag{12}$$

$$A_1(z) = A_1(0)\exp[i\bar{\gamma}(P_1+2P_3)z] \tag{13}$$

In a $\chi^{(3)}$ medium, the pump waves are subject to SPM and CPM. Let $$A_1(0) = B_1 \tag{14a}$$

$$A_2(z) = B_2(z)\exp[-i\beta z/2 + i3\bar{\gamma}(P_3+P_1)z/2] \tag{14b}$$

$$A_3(0) = B_3 \tag{14c}$$

Then, the transformed signal amplitude obeys the (linearized) equation:

$$d_z - i\delta)B_2 = i\gamma B_2^* \quad (15)$$

where $\delta = \beta/2 + \bar{\gamma}(P_3 + P_1)/2$ and $\gamma = 2\bar{\gamma}B_3B_1$. Eq. (15) has the same form as Eq. (8). Hence, the input-output relation for the process of FIG. 3 is described by Eqs. (9), and this process provides phase-sensitive amplification in a fiber. Note that a process governed by Eqs. (9) provides signal gain that increases as an exponential function of the fiber length (see the preceding subsection). This characteristic is advantageously different from that of the above-described interferometer schemes (capable of providing only a much slower quadratic gain).

Figure 4:
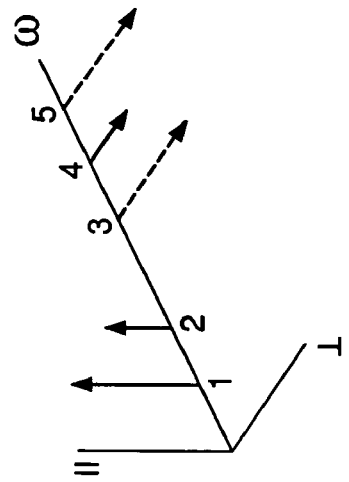
FIG. 4 graphically illustrates a vector FWM process according to another embodiment of the invention.

FIG. 4 graphically illustrates a vector FWM process according to another embodiment of the invention. FIG. 4 is a polarization diagram analogous to that shown in FIG. 3. In FIG. 4, waves <1> and <4> are cross-polarized pump waves, and waves <2> and <3> are signal and idler waves. All waves propagate in a fiber along the same direction. When the pump waves are cross-polarized (a distinguishing feature of vector FWM), e.g., as shown in FIG. 4, then the signal wave is aligned with one pump wave and the idler is aligned with the other pump wave. Note that the process illustrated in FIG. 4 is a degenerate process, where $\omega_3 = \omega_2$.

The vector FWM process of FIG. 4 is governed by the frequency-matching condition given by Eq. (16):

$$\omega_4 + \omega_1 = 2\omega_2 \quad (16)$$

and the following amplitude equations:

$$d_zA_1 = i\bar{\gamma}(|A_1|^2 + 2|A_2|^2 + \epsilon|A_3|^2 + \epsilon|A_4|^2)A_1 + i\bar{\gamma}\epsilon A_2{}^2A_3A_4^* \exp(i\beta z) \quad (17a)$$

$$d_zA_2 = i\bar{\gamma}(2|A_1|^2 + |A_2|^2 + \epsilon|A_3|^2 + \epsilon|A_4|^2)A_1 + i\bar{\gamma}\epsilon A_3^*A_4A_1 \exp(-i\beta z) \quad (17b)$$

$$d_zA_3 = i\bar{\gamma}(\epsilon|A_1|^2 + \epsilon|A_2|^2 + |A_3|^2 + 2|A_4|^2)A_3 + i\bar{\gamma}\epsilon A_4A_1A_2^* \exp(-i\beta z) \quad (17c)$$

$$d_zA_4 = i\bar{\gamma}(\epsilon|A_1|^2 + \epsilon|A_2|^2 + 2|A_3|^2 + |A_4|^2)A_4 + i\bar{\gamma}\epsilon A_1^*A_2A_3 \exp(i\beta z) \quad (17d)$$

where $A_j$ is the amplitude of the corresponding wave, z is the wave propagation direction, $\beta = \beta_2 + \beta_3 - \beta_4 - \beta_1$ is the wave-number mismatch, $\bar{\gamma}$ is the nonlinear coupling coefficient for co-polarized waves, and $\epsilon$ is the ratio of the coupling coefficients for cross-polarized and co-polarized waves. For (polarization-maintaining) fibers with constant dispersion, $\epsilon = 2/3$; and for (non-polarization-maintaining) fibers with random dispersion, $\epsilon = 1$.

Suppose that waves <4> and <1> are relatively strong pump waves, and waves <2> and <3> are the polarization components of a relatively weak signal. Then, in the small-signal approximation, the pump photon-fluxes ($P_{1,4}$) are constant and:

$$A_4(z) = A_4(0)\exp[i\bar{\gamma}(\epsilon P_1 + P_4)z] \quad (18)$$

$$A_1(z) = A_1(0)\exp[i\bar{\gamma}(P_1 + \epsilon P_4)z] \quad (19)$$

As in the scalar process described above, the pump waves are subject to SPM and CPM. Let $$A_1(0) = B_1 \quad (20a)$$

$$A_2(z) = B_2(z)\exp[-i\beta z/2 + i\bar{\gamma}3P_1z/2 + i\bar{\gamma}(\epsilon - 1/2)P_4z] \quad (20b)$$

$$A_3(z) = B_3(z)\exp[-i\beta z/2 + i\bar{\gamma}(\epsilon - 1/2)P_1z + i\bar{\gamma}3P_4z/2] \quad (20c)$$

$$A_4(0) = B_4 \quad (20d)$$

Then, the transformed signal components obey the following (linearized) equations:

$$(d_z - i\delta)B_2 = i\gamma B_3^* \quad (21)$$

$$(d_z + i\delta)B_3^* = -i\gamma^* B_2 \quad (22)$$

where $\delta = \beta/2 + \bar{\gamma}(P_4 + P_1)/2$ and $\gamma = \bar{\gamma}\epsilon B_4B_1$. It follows from Eqs. (21)-(22) that:

$$B_2(z) = \mu(z)B_2(0) + \nu(z)B_3^*(0) \quad (23)$$

$$B_3^*(z) = \nu^*(z)B_2(0) + \mu^*(z)B_3^*(0) \quad (24)$$

where $\mu$ and $\nu$ are defined in Eqs. (9b)-(9c). In quantum optics, the input-output relation defined by Eqs. (23) and (24) is called a two-mode squeezing transformation. If there is no input idler (i.e., $B_3(0) = 0$), then the output idler is proportional to the complex conjugate of the input signal, and the FWM process illustrated in FIG. 4 is a phase conjugation (PC) process. If the input signal is split evenly between the two orthogonal polarizations (i.e., $B_3(0) = B_2(0)$), then Eq. (23) reduces to Eq. (9a). Hence, the degenerate vector FWM of FIG. 4 produces phase-sensitive amplification characterized by an exponential gain function (i.e., with the signal gain increasing exponentially with the fiber length).

Figure 5:
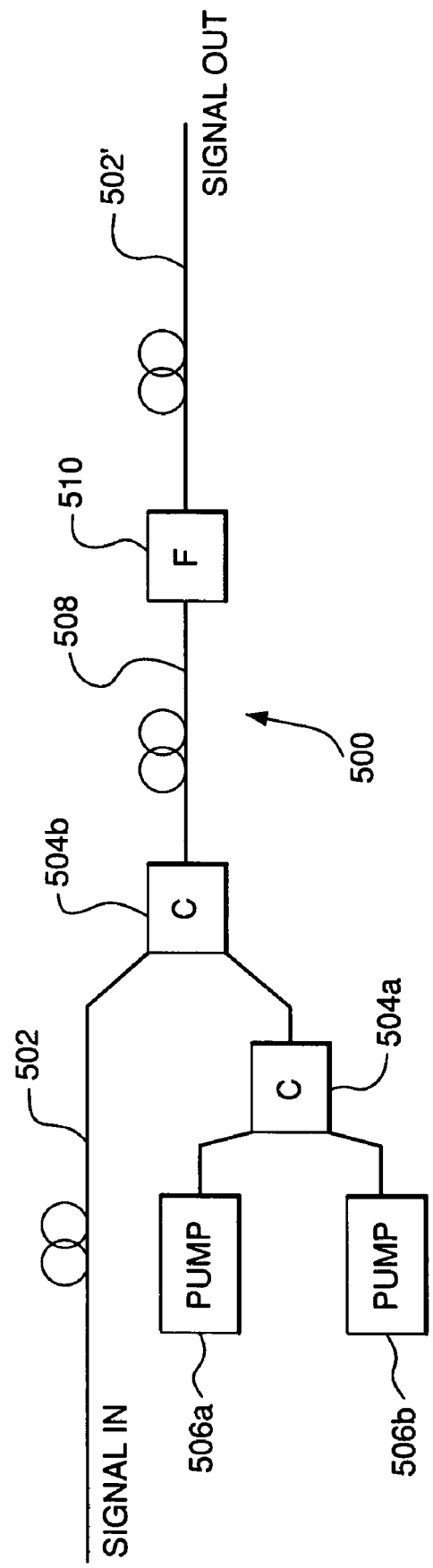
FIG. 5 shows an optical fiber amplifier (OFA), in which the processes illustrated in FIGS. 3 and 4 can be carried out according to one embodiment of the invention.

FIG. 5 shows an optical fiber amplifier (OFA) 500, in which the processes illustrated in FIGS. 3 and 4 can be carried out according to one embodiment of the invention. OFA 500 is coupled between two sections 502 and 502' of an optical fiber and has couplers 504a-b configured to combine an optical communication signal from section 502 with pump waves generated by pump-wave sources (e.g., lasers) 506a and 506b. For example, in reference to FIG. 3, pump-wave source 506a can generate pump wave <1> while pump-wave source 506b generates pump wave <3>. In reference to FIG. 4, pump-wave sources 506a and 506b generate pump waves <1> and <4>, respectively. The two pump waves are combined together using coupler 504a, and the resulting wave is then combined with the optical communication signal using coupler 504b. Couplers 504a-b incorporate polarization filters as appropriate and/or necessary to provide a desired polarization configuration, e.g., as illustrated in FIGS. 3 and 4. In another embodiment, a three-way coupler may be used to combine the optical communication signal with the pump waves. In general, as long as the two pump waves and the optical communication signal are coupled into a highly non-linear fiber (HNLF) 508, they can be combined in any combination/sequence. Depending on the implementation of OFA 500, the pump waves may be continuous-wave (CW) or pulsed optical signals. The optical communication signal interacts with the pump waves in HNLF 508, e.g., as described above in the context of FIGS. 3 and 4, and is amplified due to this interaction. A filter 510 placed at the end of HNLF 508 separates the amplified optical communication signal from the pump waves for further transmission in the communication system via section 502'.

Cascaded Four-Wave Mixing Processes in a $\chi^{(3)}$ Medium

The degenerate FWM processes described in the preceding subsection provide phase-sensitive amplification in a fiber because the frequency degeneracies allow the signal amplitudes to interact with their complex-conjugates (see Eqs. (9)). More specifically, in the degenerate PC process of FIG. 3, the idler and signal waves have the same frequency, $\omega_2$. Similarly, in the degenerate PC process of FIG. 4, the idler and signal waves have the same frequency, $\omega_2 = \omega_3$. Non-degenerate PC processes that are analogous to the degenerate PC processes shown in FIGS. 3 and 4, can provide phase-sensitive amplification in a fiber if the idler amplitude is nonzero and the idler wave has a specific phase with respect to the signal wave. However, such an idler wave is usually absent. Embodiments of the cascaded FWM schemes disclosed below address this problem by providing such an idler wave, e.g., by using Bragg scattering (BS) as an additional FWM process. More specifically, BS generates an idler wave that is a frequency-shifted, but non-conjugated, image of the signal wave. Once the idler wave has been generated by BS, a non-degenerate PC process analogous to that of FIG. 4 can be used to provide phase-sensitive amplification.

Figure 6:
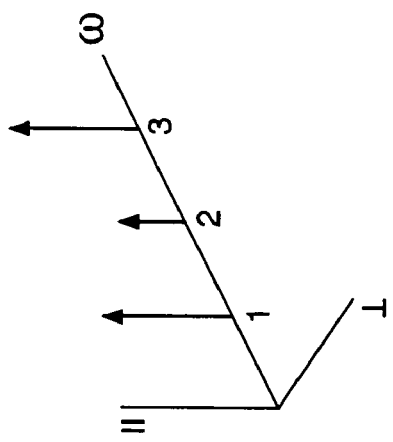
FIG. 6 graphically illustrates a scalar cascaded FWM process according to one embodiment of the invention.

FIG. 6 graphically illustrates a scalar cascaded FWM process according to one embodiment of the invention. FIG. 6 is a polarization diagram analogous to those shown in FIGS. 3 and 4. In FIG. 6, waves <1>, <3>, and <5> are pump waves, wave <2> is a signal wave, and wave <4> is an idler wave. All waves are (vertically) co-polarized and propagate in a fiber along the same direction. Wave <1> is on for both the BS and PC processes. However, during BS, wave <3> is on and wave <5> is off; and, during PC, wave <3> is off and wave <5> is on.

Figure 7:
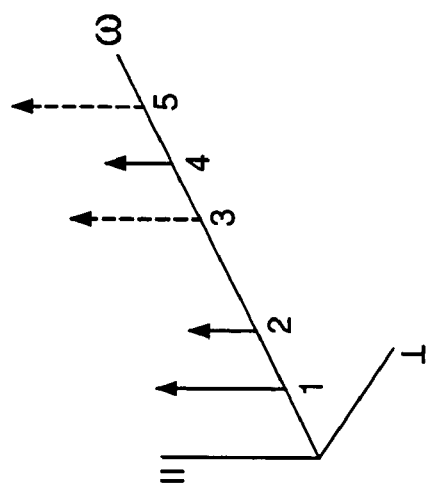
FIG. 7 graphically illustrates a vector cascaded FWM process according to another embodiment of the invention.

FIG. 7 graphically illustrates a vector cascaded FWM process according to another embodiment of the invention. FIG. 7 is analogous to FIG. 6. In FIG. 7, waves <1>, <3>, and <5> are pump waves, wave <2> is a signal wave, and wave <4> is an idler wave. Waves <1> and <2> are vertically polarized and waves <3>, <4>, and <5> are horizontally polarized. All waves propagate in a fiber along the same direction. Wave <1> is on for both the BS and PC processes; during BS, wave <3> is on and wave <5> is off; and, during PC, wave <3> is off and wave <5> is on. Note that the following description applies to both FIGS. 6 and 7.

Consider the BS process. As already explained above, BS is governed by the frequency-matching condition:

$$\omega_2 + \omega_3 = \omega_4 + \omega_1 \quad (25)$$

and the amplitude equations analogous to Eqs. (17). Note that, unlike for the FWM process described in the preceding subsection, for the BS process, waves <1> and <3> are the pump waves (rather than waves <1> and <4> above), wave <2> is the signal wave, and wave <4> is the idler wave (rather than wave <3> above). Because power flows from the signal to the idler, the photon flux of the output idler wave cannot exceed the photon flux of the input signal wave. As a result, BS is intrinsically stable (i.e., does not provide gain).

Suppose that waves <1> and <3> are strong pumps, wave <2> is a weak signal, and wave <4> is a weak idler. Then, in the small-signal approximation, the pump photon-fluxes ($P_1$, $_3$) are constant and:

$$A_1(z) = A_1(0)\exp[i\bar{\gamma}(P_1 + \epsilon P_3)z] \quad (26)$$

$$A_3(z) = A_3(0)\exp[i\bar{\gamma}(\epsilon P_1 + P_3)z] \quad (27)$$

As in the PC process described above, the pump waves are subject to SPM and CPM. Let $$A_1(0) = B_1 \quad (28a)$$

$$A_2(z) = B_2(z)\exp[-i\beta z/2 + i\bar{\gamma}3P_1 z/2 + i\bar{\gamma}(\epsilon + \frac{1}{2})P_3 z] \quad (28b)$$

$$A_3(0) = B_3 \quad (28c)$$

$$A_4(z) = B_4(z)\exp[i\beta z/2 + i\bar{\gamma}(\epsilon + \frac{1}{2})P_1 z + i\bar{\gamma}3P_3 z/2] \quad (28d)$$

Then, the signal and idler amplitudes obey the following (linearized) equations:

$$(d_z - i\delta)B_2 = i\gamma B_4 \quad (29)$$

$$(d_z + i\delta)B_4 = i\gamma^* B_2 \quad (30)$$

where $\delta = \beta/2 + \bar{\gamma}(P_1 - P_3)/2$ and $\gamma = \bar{\gamma}\epsilon B_1 B_3^*$. It follows from Eqs. (29) and (30) that $$B_2(z) = \mu(z)B_2(0) + \nu(z)B_4(0) \quad (31)$$

$$B_4(z) = -\nu(z)^* B_2(0) + \mu^*(z)B_4(0) \quad (32)$$

where the transfer functions are $$\mu(z) = \cos(kz) + i(\delta/k)\sin(kz) \quad (33)$$

$$\nu(z) = i(\gamma/k)\sin(kz) \quad (34)$$

and the wavenumber $k = (|\gamma|^{2'}\delta^2)^{1/2}$. The transfer functions satisfy the auxiliary equation $|\mu|^2 + |\nu|^2 = 1$. In quantum optics, the input-output relation defined by Eqs. (31)-(34) is called a beam-splitter transformation. For a representative case, in which $\delta = 0$, $k = \pi/2$ and $\gamma$ is real, $B_2(z) = B_2(0)/2^{1/2}$ and $B_4(z) = iB_2(0)/2^{1/2}$. Thus, the output idler wave is a phase-shifted, but non-conjugated image of the signal wave. (Note that the phase shift results from photon-flux conservation.) Because the signal and idler frequencies are distinct, their relative phases can be different in the BS and PC processes (note that, because $k_4 \neq k_2$, propagation effects can change the relative phase naturally).

Now consider the PC process in which waves <5> and <1> are pump waves, wave <2> is a signal wave, and wave <4> is an idler wave. This process is governed by the frequency-matching condition $$\omega_5 + \omega_1 = \omega_2 + \omega_4 \quad (35)$$

and the amplitude equations given by Eqs. (17), in which the subscripts 3 and 4 are replaced by the subscripts 4 and 5, respectively. The effects of SPM and CPM on the pump waves are described by Eqs. (18) and (19). The signal and idler amplitudes obey the following (linearized) equations:

$$(d_z - i\delta)B_2 = i\gamma B_4^* \quad (36)$$

$$(d_z + i\delta)B_4^* = -i\gamma^* B_2 \quad (37)$$

where $\delta = \beta/2 + \bar{\gamma}(P_5 + P_1)/2$, $\gamma = \bar{\gamma}\epsilon B_5 B_1$, and $\beta = \beta_2 + \beta_4 - \beta_5 - \beta_1$. It follows from Eqs. (36) and (37) that $$B_2(z'') = \mu(z'' - z')B_2(z') + \nu(z'' - z')B_4^*(z') \quad (38)$$

$$B_4^*(z'') = \nu^*(z'' - z')B_2(z') + \mu^*(z'' - z')B_4^*(z') \quad (39)$$

where $\mu$ and $\nu$ are defined by Eqs. (9b) and (9c), respectively. Because $B_2(z')$ is proportional to $B_2(0)$ and $B_4^*(z')$ is proportional to $B_2^*(0)$, cascaded BS and PC provide PSA in a fiber. By controlling the phase of pump wave <5>, one controls the relative phase of the pump, signal, and idler waves and, hence, the orientation of the squeezing axis. For the representative case described above after Eq. (34), in which $|B_4(z')| = |B_2(z')|$, Eq. (38) reduces to Eq. (9a). It should be noted that the choice of pump frequencies is not unique. That is, different combinations of pump frequencies can provide phase-sensitive amplification by cascaded BS and PC. Furthermore, BS can also be used to combine a signal wave with the frequency-shifted, and conjugated, idler wave produced by prior PC.

Figure 8:
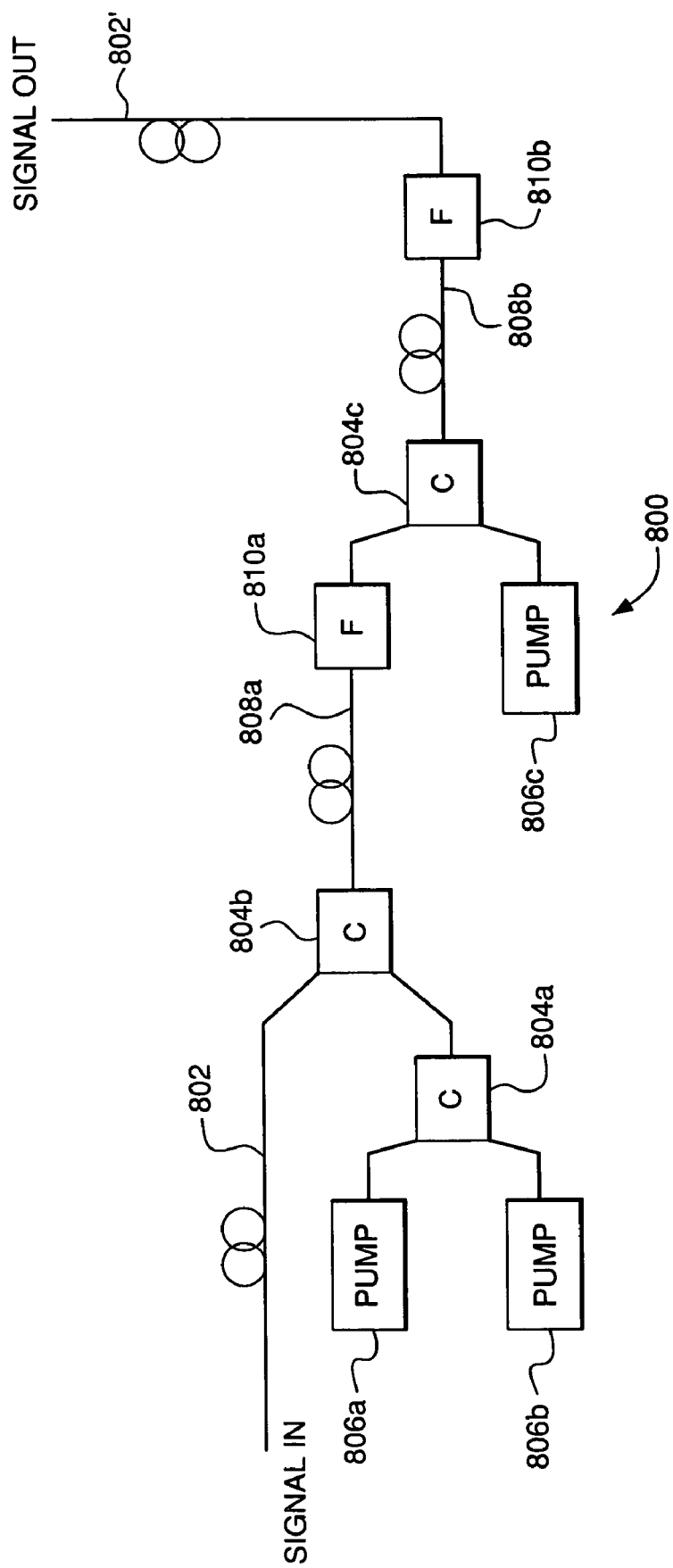
FIG. 8 shows an OFA, in which the processes illustrated in FIGS. 6 and 7 can be carried out according to one embodiment of the invention.

FIG. 8 shows an OFA 800, in which the processes illustrated in FIGS. 6 and 7 can be carried out according to one embodiment of the invention. OFA 800 is similar to OFA 500 (FIG. 5) in that it is coupled between two sections 802 and 802' of an optical fiber. However, one difference between OFAs 500 and 800 is that the latter OFA has two cascaded stages. The first stage in OFA 800 includes pump-wave sources (e.g., lasers) 806a-b, couplers 804a-b, an HNLF 808a, and a filter 810a. The output of the first stage is fed into the second stage that includes a pump-wave source 806c, a coupler 804c, an HNLF 808b, and a filter 810b. In one embodiment, couplers 804a-c incorporate polarization filters as appropriate and/or necessary to provide a desired polarization configuration, e.g., as illustrated in FIGS. 6 and 7.

Coupler 804a combines the pump waves generated by pump-wave sources 806a and 806b, and coupler 804b combines the resulting pump wave the optical communication signal received from section 802. The combined pump and signal waves interact in HNLF 808a via a BS process to generate an idler wave, e.g., as described above. Filter 810a placed at the end of HNLF 808a then filters out one of the pump waves (e.g., the pump wave generated by pump-wave source 806b) while passing the other pump wave (e.g., the pump wave generated by pump-wave source 806a) and the signal and idler waves to the second stage.

Coupler 804c adds to the waves received from the first stage a pump wave generated by pump-wave source 806c. These pump, signal, and idler waves interact in HNLF 808b via a PC process to generate an amplified wave, e.g., as described above. Filter 810b placed at the end of HNLF 808b then separates the amplified wave from the other waves present in HNLF 808b for further transmission in the communication system via section 802'. In general, since both the signal wave and the idler wave are amplified in HNLF 808b, either one of them, or both, can be used as an amplified output of OFA 800. In reference to FIGS. 6-7, pump sources 806a-c and filter 810a can be configured as follows: pump sources 806a-c generate pump waves <1>, <3>, and <5>, respectively, and filter 810a blocks pump wave <3>.

While this invention has been described with reference to illustrative embodiments, this description is not intended to be construed in a limiting sense. For example, in different OFA implementations, optical fibers having different properties (e.g., polarization maintaining or regular fibers) may be used. Polarization sensitive filters or polarizers can be appropriately inserted at different locations of the OFA to provide a desired polarization configuration. The pump waves may be CW or pulsed. Two, three, or more pump waves may be used. Idler waves may be filtered out or used in the communication system, e.g., as protection signals in a 1+1 protection scheme. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. A method of generating an optical signal, comprising:
   (a) applying an input signal and first and second pump waves to a first fiber, wherein the first pump wave has a first wavelength and the second pump wave has a second wavelength different from the first wavelength; and
   (b) generating, in the first fiber, an optical output signal corresponding to the input signal by way of phase-sensitive amplification, wherein;
      energy is transferred from the first and second pump waves to the output signal; and
      said phase-sensitive amplification couples the first and second pump waves and the output signal via a squeezing transformation.

2. The invention of claim 1, wherein, for step (b), the generation of the output signal is based on a phase-conjugation (PC) process, which couples the first pump wave, the second pump wave, and the input signal.

3. The invention of claim 1, wherein:
   for step (b), signal gain increases as an exponential function of fiber length; and
   the first and second pump waves are co-propagating waves.

4. The invention of claim 1, wherein polarizations of the first and second pump waves are substantially parallel.

5. The invention of claim 1, wherein the first and second pump waves are substantially orthogonally polarized with respect to one another.

6. The invention of claim 1, further comprising separating the output signal from the first and second pump waves using an optical filter.

7. The invention of claim 1, further comprising:
   applying the input signal, the first pump wave, and a third pump wave to a second fiber, wherein the third pump wave has a third wavelength different from the first and second wavelengths; and
   generating, in the second fiber, an idler signal corresponding to the input signal by way of a Bragg scattering (BS) process, which couples the first pump wave, the third pump wave, the input signal, and the idler signal.

8. The invention of claim 7, further comprising separating the first pump wave, the input signal, and the idler signal from the third pump wave using an optical filter, wherein the separated first pump wave, the input signal, and the idler signal are applied to the first fiber.

9. The invention of claim 8, wherein, for step (b), the generation of the output signal is based on a phase-conjugation (PC) process, which couples the first pump wave, the second pump wave, the input signal, and the idler signal.

10. The invention of claim 7, wherein polarizations of the first, second, and third pump waves are substantially parallel.

11. The invention of claim 7, wherein:
    the first and second pump waves are substantially orthogonally polarized with respect to one another;
    polarizations of the second and third pump waves are substantially parallel;
    polarization of the input signal is substantially parallel to the polarization of the first pump wave; and
    polarization of the idler signal is substantially parallel to the polarization of the third pump wave.

12. The invention of claim 7, wherein the input signal and the idler signal are substantially orthogonally polarized with respect to one another.

13. The invention of claim 7, wherein the output signal comprises an amplified idler signal.

14. A device, comprising:
    a first fiber;
    first means for applying an input signal, a first pump wave, and a second pump wave to the first fiber, wherein:
       the first pump wave has a first wavelength and the second pump wave has a second wavelength different from the first wavelength; and
       the first fiber generates an output signal corresponding to the input signal by way of phase-sensitive amplification, wherein energy is transferred from the first and second pump waves to the output signal.

15. The invention of claim 14, wherein the first means for applying comprises:

a first coupler adapted to combine the first pump wave and the second pump wave; and a second coupler adapted to combine (i) the combined first and second pump waves and (ii) the input signal.

16. The invention of claim 14, further comprising a filter coupled to an end of the first fiber and adapted to pass the output signal and substantially block the first and second pump waves.

17. The invention of claim 14, further comprising:

a second fiber;

second means for applying the input signal, the first pump wave, and a third pump wave to the second fiber, wherein:

the third pump wave has a third wavelength different from the first and second wavelengths; and the second fiber is adapted to generate an idler signal corresponding to the input signal by way of a Bragg scattering (BS) process, which couples the first pump wave, the third pump wave, the input signal, and the idler signal; and a first filter coupled between the first and second fibers and adapted to pass the first pump wave, the input signal, and the idler signal and substantially block the third pump wave, wherein:

the passed first pump wave, input signal, and idler signal are combined with the second pump wave and applied to the first fiber; and the first fiber is adapted to generate the output signal by way of a phase-conjugation (PC) process, which couples the first pump wave, the second pump wave, the input signal, and the idler signal.

18. The invention of claim 17, wherein:

the second means for applying comprises:

a first coupler adapted to combine the first pump wave and the third pump wave; and a second coupler adapted to combine (i) the combined first and third pump waves and (ii) the input signal; and the first means for applying comprises a third coupler adapted to combine (i) the separated first pump wave, input signal, and idler signal and (ii) the second pump wave.

19. The invention of claim 17, further comprising means for generating the first pump wave, the second pump wave, and the third pump wave.

20. The invention of claim 17, further comprising a second filter coupled to an end of the first fiber and adapted to pass the output signal and substantially block the first and second pump waves.

21. The invention of claim 1, wherein the steps of applying and generating are implemented in a device that comprises:

the first fiber; and means for applying the input signal, the first pump wave, and the second pump wave to the first fiber, wherein the first fiber generates the output signal by said way of phase-sensitive amplification.

22. The invention of claim 1, wherein the input signal and the first and second pump waves satisfy the following frequency-matching condition:

$$\omega_{p1}+\omega_{p2}=2\omega_i$$

where:

$\omega_{p1}$ is the frequency of the first pump wave that corresponds to the first wavelength;

$\omega_{p2}$ is the frequency of the second pump wave that corresponds to the second wavelength; and $\omega_i$ is a frequency of the input signal.

23. A method of generating an optical signal, comprising:

applying an input signal and first and second pump waves to a first fiber, wherein the first pump wave has a first wavelength and the second pump wave has a second wavelength different from the first wavelength;

generating, in the first fiber, an output signal corresponding to the input signal by way of phase-sensitive amplification, wherein energy is transferred from the first and second pump waves to the output signal;

applying the input signal, the first pump wave, and a third pump wave to a second fiber, wherein the third pump wave has a third wavelength different from the first and second wavelengths; and generating, in the second fiber, an idler signal corresponding to the input signal by way of a Bragg scattering (BS) process, which couples the first pump wave, the third pump wave, the input signal, and the idler signal.

24. The invention of claim 23, further comprising separating the first pump wave, the input signal, and the idler signal from the third pump wave using an optical filter, wherein the separated first pump wave, the input signal, and the idler signal are applied to the first fiber.

25. The invention of claim 24, wherein, for the step of generating in the first fiber, the generation of the output signal is based on a phase-conjugation (PC) process, which couples the first pump wave, the second pump wave, the input signal, and the idler signal.

26. The invention of claim 23, wherein polarizations of the first, second, and third pump waves are substantially parallel.

27. The invention of claim 23, wherein the output signal comprises an amplified idler signal.

28. A method of generating an optical signal, comprising:

(a) applying an input signal and first and second pump waves to a first fiber, wherein the first pump wave has a first wavelength and the second pump wave has a second wavelength different from the first wavelength; and (b) generating, in the first fiber, an output signal corresponding to the input signal by way of phase-sensitive amplification, wherein energy is transferred from the first and second pump waves to the output signal, wherein the steps of applying and generating are implemented in a device that comprises:

the first fiber; and means for applying the input signal, the first pump wave, and the second pump wave to the first fiber, wherein the first fiber generates the output signal by said way of phase-sensitive amplification.

* * * * *